June 22, 1971 SHIGENARI SODA ET AL 3,586,574
APPARATUS FOR MAKING A SANDWICH PANEL
Filed June 13, 1968 4 Sheets-Sheet 2
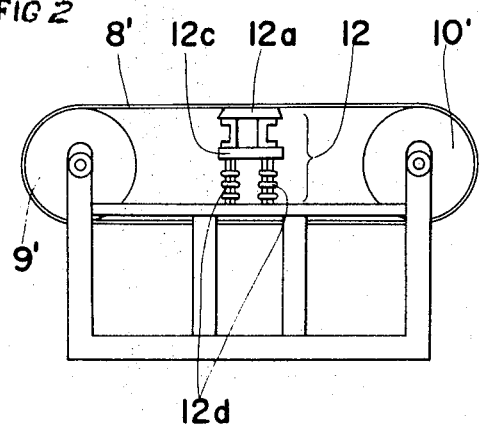
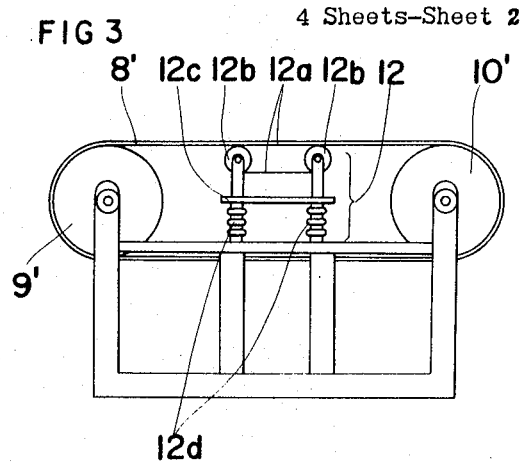
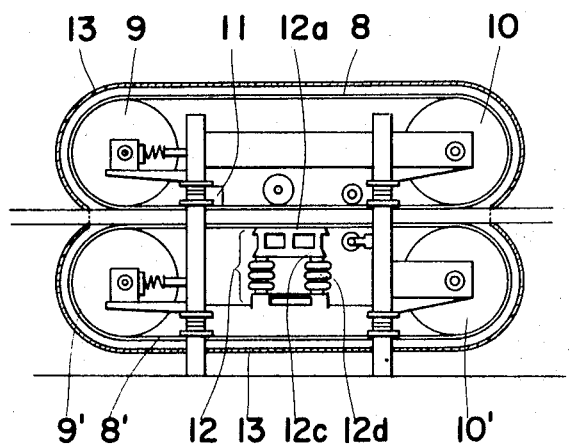
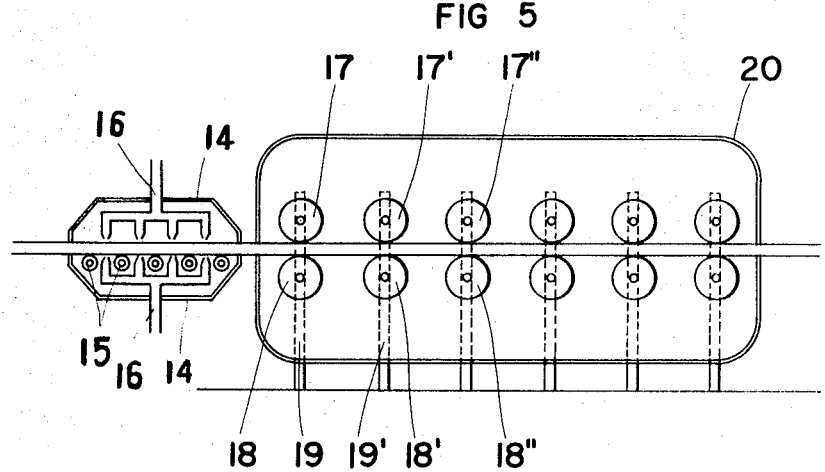

3,586,574
APPARATUS FOR MAKING A SANDWICH PANEL
Shigenari Soda, Kyoto, Tatsujiro Seki, Nara, Hiroji Abu, Suita, Susumu Ishiwatari, Sakai, and Ken Yamamoto, Nara, Japan, assignors to Seikisui Sponge Kogyo Kabushiki Kaisha, Kita-ku, Osaka-shi, Japan
Filed June 13, 1968, Ser. No. 736,814
Claims priority, application Japan, June 21, 1967, 42/40,077
Int. Cl. B29d 7/14; B29b 31/26
U.S. Cl. 156—380                                                     2 Claims

ABSTRACT OF THE DISCLOSURE

Apparatus for continuous forming of sandwich-type panels having a porous thermoplastic resin layer interposed between and affixed to outer sheets of facing material.

---

This invention relates to an apparatus for continuous preparation of sandwich-type panels wherein a porous thermoplastic resin layer is interposed between and affixed to two sheets of facing materials. In particular, this invention relates to an improvement in an apparatus for the continuous preparation of sandwich-type panels wherein a piled structure is obtained by continuously introducing expandable thermoplastic particles between two sheets of facing material, the piled structure being held between a pair of endless belts, and being heated by high frequency electric power while held by the belts, whereby the thermoplastic particles are expanded and combined with one another to form a cellular interlayer and to affix same to the facing materials.

It is known according to U.S. Pat. No. 2,998,501 and Japanese patent publication Sho 41–1632 that sandwich-type panels are prepared by continuously supplying expandable thermoplastic resin particles integrated by water and wetting agents between two sheets of facing materials, applying high frequency electric power upon the sheets to heat the particles while same are held by a pair of endless belts, then cooling the products thus obtained. In the known apparatus and process, however, both a pair of endless belts and rolls supporting them are situated between two opposing electrodes applying high frequency electric power. It is, therefore, necessary to make the belts and rolls from material having a low power loss factor against high frequency electric power, wherefore the apparatus becomes expensive. Further, in the known apparatus, a spacing between opposing electrodes for generating high frequency electric power is so big that, even if the belts and rolls are made of lower power loss factor materials, it is unable to evade power losses when high frequency electric power is applied. Furthermore, the known apparatus is disadvantageous in that when water is added in order to heat the expandable thermoplastic particles by high frequency electric power, it is difficult to remove the water included between the two sheets of facing materials because both the heating process and the pressing process are accomplished between the same pair of endless belts. Thus, in the known apparatus and process, high cost, large power losses, as well as difficulty in removing water, when added, are inherent so that the preparation of good quality panels at low costs has not been accomplished.

The present inventors contemplated the diminution of high frequency power loss, and at first, efforts were directed to decreasing the distance between opposing electrodes in the known apparatus. Thus, attempts were made to locate the opposing electrode within the spacing enclosed by the pair of endless belts. Also, it was tried to locate idling rolls supporting the endless belts outside of the opening between the opposing electrodes. As a result, the object of diminishing the power loss was achieved to a certain degree, but not to a satisfactory extent.

Additionally, the inventor tried to further diminish the electric power loss, for example, to change one of said paired endless belts in the known apparatus into a metallic endless belt, and also to use the metallic endless belt as one of the electrode generating high frequency electric power. This effort resulted in a further decrease in power loss. In the apparatus used in the above attempt, however, it proved to be difficult to press the panel equally on both sides, as long as the panel is inserted between a metallic belt and an eletcrically insulated non-metallic belt, because one belt must be made from metal and the other from electrically insulated and low power loss factor material. Thus, it was difficult to produce the flat sandwich-type panel. Moreover, in that attempt, when water was added to heat the thermoplastic resin particles, the water was prevented from escaping from the panel before the panel was combined to unity, because the heating and pressing were accomplished while the sheets were held by paired endless belts. Consequently, the thermoplastic particles were prevented from adhering to one another, so that the sandwich-type panel thus obtained was weak in strength. It was necessary to dry further, when water was added, because the panel contained such a large amount of water, and this involved added difficulties.

Described briefly, the present apparatus is characterized in that the heating process and the forming process are carried out in different steps respectively, the heating process comprising heating the expandable thermoplastic resin particles interposed between two facing materials by high frequency electric power, the forming process comprising pressing into unity both the facing materials and the particles after the heating process has been completed. Moreover, this invention is characterized in that the heating process is carried out between a pair of endless belts, one being metallic and the other non-metallic, the non-metallic belt being made from material which is electrically insulated as well as of a low loss factor for high frequency electric power. Further, this invention is characterized in that the metallic belt is grounded and constitutes the one electrode for high frequency electric power, and the opposing electrode is situated within the spacing enclosing the electrically insulated belt made from low loss factor materials.

Furthermore, this invention is characterized in that the forming process is carried out between a number of paired rolls arranged in such parallel and spaced relation that all paired rolls can maintain a plane sheet in the openings therebetween.

Finally, this invention is characterized in that it is possible to adjust independently both the spacing between a pair of endless belts in the heating part and the spacing between numbers of paired rolls in the forming part.

The apparatus according to the present invention comprises a material supplying part, a heating part, a forming part and a cooling part, each part being positioned in this order, the material supplying part comprising equipment which continuously supplies at least two sheets of facing materials, piles them in parallel and spaced relation, and continuously supplies expandable thermoplastic particles at a uniform rate of quantity into the spacing between the facing materials. The heating part comprises a pair of endless belts and a high frequency generating unit, the belts, one of which is made from metal and the other is made from electrically insulated material having a low power loss factor against high frequency electric power, are arranged substantially in parallel and adjustably spaced relation and are movable in the same direction at equal speed, said metallic belt itself being used for a high frequency electrode, the opposing electrode being established within the spacing enclosed by the endless belt made from the low power loss factor material. The forming part comprises numbers of pairs of rolls arranged substantially in parallel and adjustably spaced relation so as to maintain a flat sheet between the spacing, some of the rolls being driven to further advance the sheet from the heating part.

There is thus described the fundamental concept of the apparatus of the present invention.

In the invented apparatus, another pair of metallic endless belts may be added to the numbers of paired rolls in the forming part so that the forming process may be prosecuted by pressing continuously and in substantially uniform strength between a pair of metallic endless belts. Moreover, the invented apparatus may be equipped with a drying part between the heating part and the forming part, when the pair of metallic endless belts are added to the forming part.

Furthermore, the material-supplying part of the invented apparatus includes the equipment which furnish two sheets of facing material in parallel and spaced relation, and which interpose expandable thermoplastic particles integrated by water and wetting agents between the facing materials.

The heating part of the invented apparatus includes the equipment which may adjust the opening between the metallic and non-metallic belts; and the forming part of the invented apparatus includes the equipment which may adjust the nip or opening between paired rolls or the opening between a pair of metallic endless belts.

Finally, the invented process for preparing the sandwich-type panel may comprise at least 4 steps, i.e., a material supplying step, a heating step, a drying step and a forming step arranged in that order. The material supplying step comprises furnishing at least two sheets of facing material in parallel and spaced relation, and interposing expandable thermoplastic particles integrated by water and wetting agents between the facing materials. Thus, the material supplying step produces piled structure. The heating step comprises heating the piled structure while same is held but not pressed between the metallic and non-metallic belts by the application of high frequency electric power. Meanwhile, the sheets of facing materials are maintained so spaced that the expandable particles in said piled structure do not completely cohere to neighboring particles; and the forming step comprises pressing the piled structure between a pair of metallic endless belts into laminated unity wherein expandable particles are combined to form a porous layer which is affixed firmly to the facing materials.

Thermoplastic resins useful in this invention are polymers and copolymers of vinyl chloride, vinylidene chloride, ethylene, propylene, styrene, methyl methacrylate. Among said polymers and copolymers, polyvinyl chloride and polyvinylidene chloride have high power loss factor against high frequency electric power; and therefore, they can be heated by applying directly high frequency electric power. Polystyrene, polypropylene and polyethylene, however, have low power loss factor against high frequency electric power; and therefore, they cannot be heated appreciably by applying high frequency electric power. In order to heat them appreciably by high frequency, it is necessary to add water to these materials.

Thermoplastic resins useful in this invention must be expandable particles. By expandable particles are meant non-expanded and pre-expanded particles which contain an expanding agent so that they are capable of further expansion. Solid chemical compounds decomposed by heating to generate gases may be used as expanding agents; and volatile liquids such as propane, butane, pentane, hexane and petroleum ether may also be used as well as gases such as carbon dioxide and hydrogen. Thermoplastic resin particles which include such an aforesaid expanding agent may all be used for raw material in this invention.

Among various resins and expanding agents, polystyrene particles containing from about 1 to 15% by weight of volatile liquids, such as pentane, butane and hexane, and being of the order of 0.1 to 5 mm. in diameter, have been found particularly suitable. Prefoamed polystyrene particles are easily obtained by heating through contact with steam without a mold, and prefoamed particles thus obtained may conveniently be used in the practice of this invention.

It is necessary to add a small amount of water if polystyrene is used, because polystyrene is difficult to heat by directly applying high frequency electric power, as already mentioned. In order to uniformly distribute water on each polystyrene particle, it is desirable to use a small quantity of wetting agent. In U.S. Pat. No. 2,998,501 and Japanese patent publication Sho 41–1632, there are described various kinds and adequate quantities of wetting agents as well as adequate quantities of water. In that case, it may be more effective to add a small amount of electrolyte, e.g. sodium chloride, to the water.

Paper, such as kraft paper, cellophane, cloth and thermoplastic resin films may be used as facing materials, and it is desirable that such materials have an adhesive coating to provide good adherence to the thermoplastic resin particles.

In this invention, the expandable particles, when necessary, further integrated by a little amount of water and wetting agent, are continuously supplied into the spacing between the two sheets of facing materials in uniform thickness.

As stated, the piled structure thus formed is held between two endless belts, one of which is made from metals and the other from electrically insulated low loss factor materials arranged in spaced and parallel relation and supported by driving rolls, guide rolls and idling rolls, and made to advance in the same direction at the same speed; and the spacing between the belts is adjustable. The metallic endless belt is, for example, made from stainless steel, while the other belt is, for example, made from natural gum, butyl gum, or isoprene gum which may be reinforced by polyethylene terephthalate or glass fiber, if necessary. The metallic endless belt is, for example, grounded by electric carbon brushes, so that the belt itself acts as one electrode for the high frequency electric power. The two opposing electrodes are positioned in closely spaced relation, so that a high frequency electric field is formed with high efficiency.

With respect to the electrodes which are positioned within the spacing enclosed by the endless belts, it is desirable to utilize several electrodes rather than only one. Moreover, two types of electrodes can be used. One of such types is a fixed electrode on which the endless belt slides. The other type is such that an electrode surface itself can rotate along and with the endless belt, though the electrode itself is fixed at a certain place.

When it is necessary to maintain the metallic endless belt and low loss factor endless belt in parallel relation for a long distance, appropriate numbers of idling rolls are furnished for that purpose. The heating part is recommended to be covered with a housing in order to segregate that part electrically, especially from high frequency electric power and to prevent the heat from escaping. Also, it is desirable to keep that part at high temperatures by blowing hot air, for example, into either the housing or rolls, in order to maintain the metallic endless belt, driving rolls, guide rolls and idling rolls in a heated state.

Since the spacing between the belts is adjustable in the heating part, the piled structure can be maintained in a state not too tightly compressed. Thus, the piled structure passing through the heating part remains heated and all particles therein do not completely cohere to neighboring particles, but rather, small interstices remain between neighboring particles.

The piled structure passing through the heating part is conveyed to the forming part with the thermoplastic particles therein not completely adhered to neighboring particles. A drying part may be furnished, if necessary, between the heating and forming parts, and is needed especially when water is added. In the drying part, the piled structure is conveyed without being covered on all surfaces of both sides thereof with the endless belts. The piled structure, however, may be supported by rotating rolls mounted in several places to prevent the structure from sagging; and the structure may be supported only from below by an endless belt made from wire netting. In the drying part, water existing on the surfaces of thermoplastic resin particles is evaporated from the piled structure; and it is desirable to blow heated air over the surfaces of the piled structure passing through the drying part. It is also useful to prevent heat from escaping by covering the drying part with a housing.

The piled structure is conveyed to the forming part after passing through the heating part. The forming part comprises numbers of rolls which are in pairs, and the numbers of paired rolls are positioned in parallel and spaced relation so as to hold the piled structure in a flat or plane state. The nip between the rolls of each pair is adjustable and some of the rolls are driven so as to advance the sheet. The nip between the paired rolls in the forming part is adjustable, independent of the spacing between the paired endless belts in the heating part. In the forming part there may be mounted on the rolls a pair of endless belts to press the pile structure therebetween. In that case, it is desirable to construct the pair of endless belts of the same material, preferably of metal.

In the forming part of this invention, expandable thermoplastic resin particles are cohered on their whole surfaces to their neighboring particles to form an interlayer which units the two sheets of facing material, by being compressed between the paired rolls or the endless belts. In order to unite said piled structure, it is necessary to prevent the material from cooling for a while when the piled structure passes through the forming part. It is, therefore, desirable to blow hot air into the forming part, if necessary, or to cover the forming part with a housing to prevent the heat from escaping. Thus, the piled structure is not only bonded to one body but also controlled in uniform thickness in the forming part. In this part, piled structure is also subjected to equal pressure from both upper and lower sides, therefore, the obtained product is not warped. The piled structure, after passing through the forming part, may be allowed to cool into flat sheet, if necessary, between the numbers of paired rolls.

The invented apparatus and process are hereinafter explained by examples. In the examples, polystyrene is used as a thermoplastic resin.

FIG. 2 is a schematic view showing an example of electrode structure used in the heating part of the invented apparatus;

FIG. 3 is a schematic view showing another example of electrode structure used in the heating part of the invented apparatus;

FIG. 4 is a schematic view of an example of the heating part of the invented apparatus;

FIG. 5 shows schematically an example of a drying part and the forming part of the invented apparatus;

Figure 1:
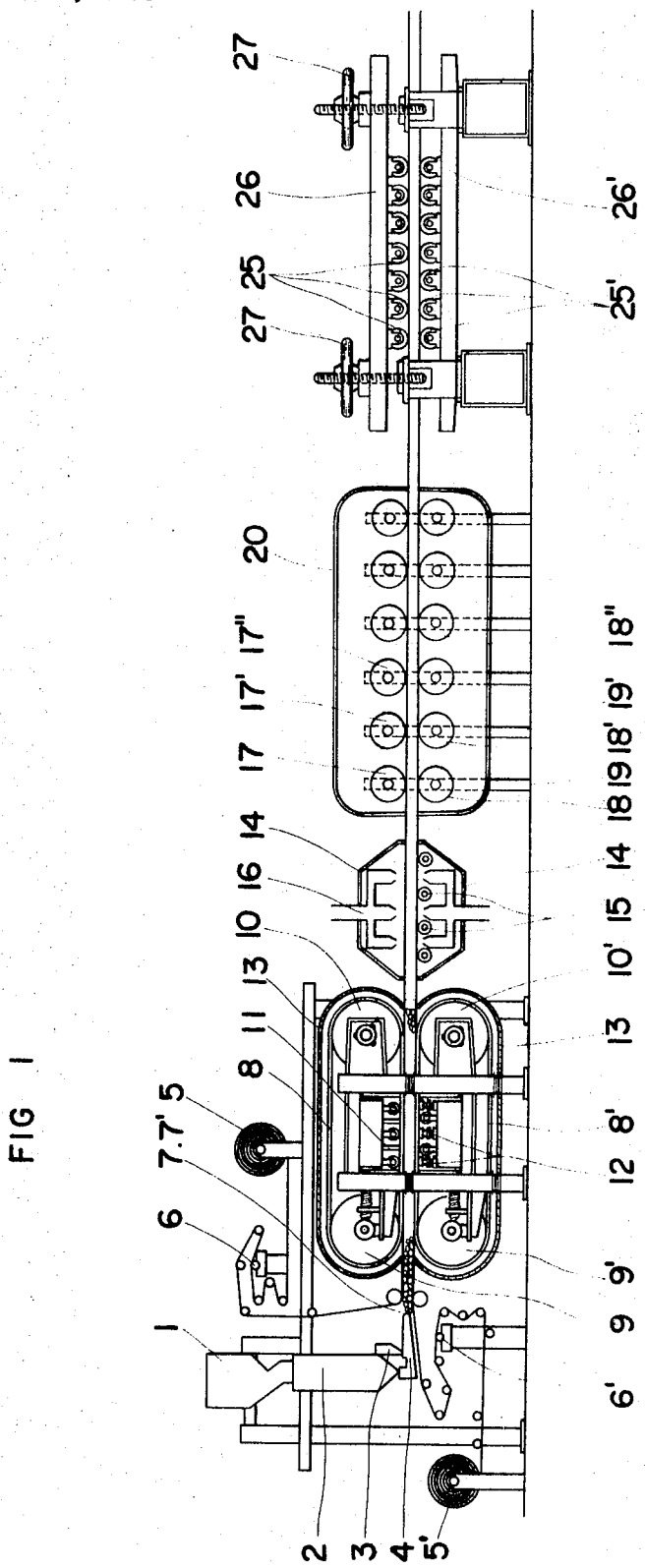
FIG. 1 is a schematic elevational view of the invented apparatus.

In FIG. 1, 1 is a tank or reservoir for expandable thermoplastic resin particles, 2 is a hopper supplying said thermoplastic particles at a predetermined rate, 3 is a tank containing a wetting agent water solution, 4 is a unit from which the particles are uniformly supplied after being integrated by the water solution.

The expandable thermoplastic resin particles are supplied at a uniform rate after being integrated by water and wetting agents. In FIG. 1, prefoamed polystyrene particles are contained in the hopper 2, and these particles are mixed with a wetting agent containing water from the tank 3 while feeding from the hopper owing to gravitation. Immediately thereafter, the prefoamed particles integrated by said solution are further well mixed in an agitating mixer, and are conveyed as by paired propelling means such as screws. The particles are discharged in uniform thickness through a narrow slit provided at the end of a passage where through said particles are conveyed. In the vicinity of the narrow slit, two sheets of facing materials are placed in parallel relation, so that the particles are interposed between such two sheets. Moreover, the two sheets of facing material are respectively guided by rolls so that the particles are further adjusted in thickness thereby.

Figure 7:
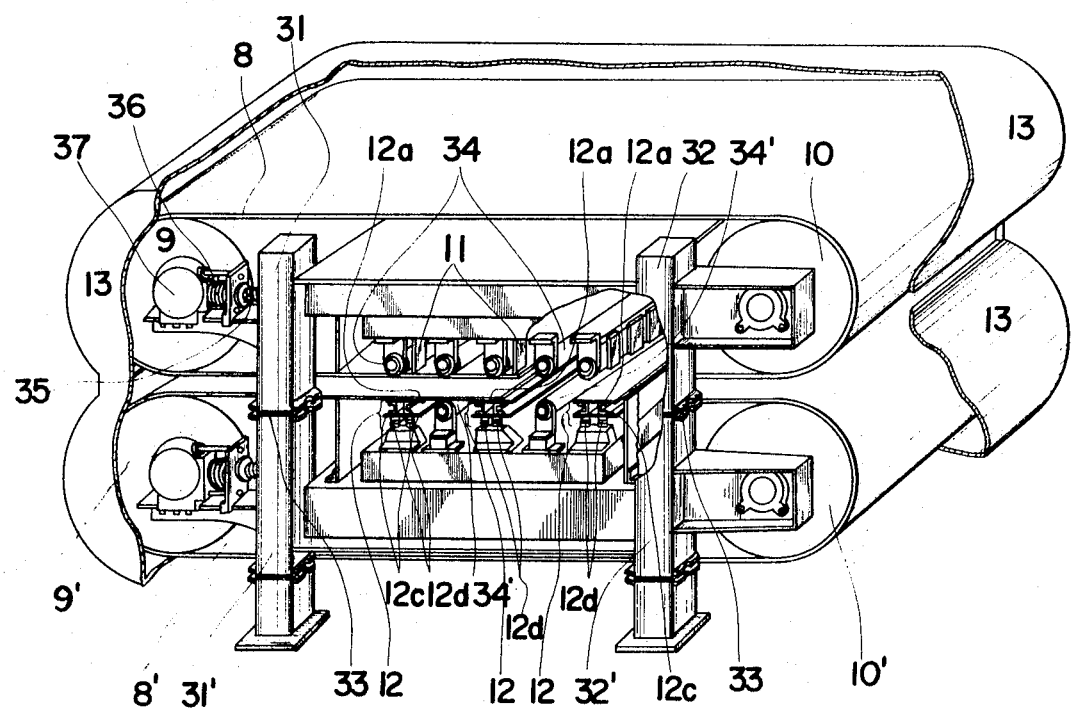
FIG. 7 is a perspective view with parts broken away to illustrate an embodiment of the heating part of the invented apparatus.
Figure 8:
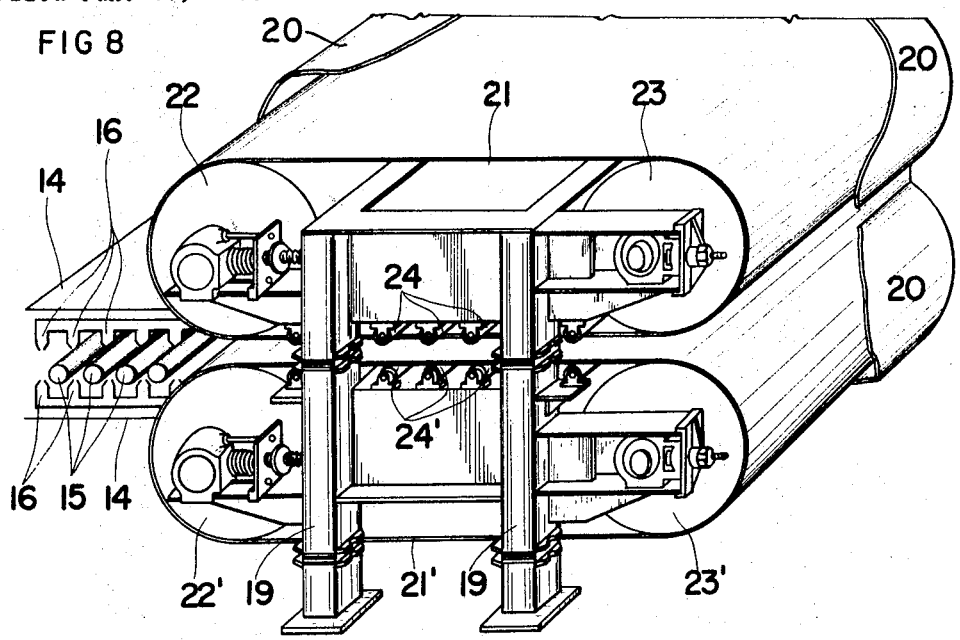
FIG. 8 is similar to FIG. 7 but illustrates a combined drying and forming part.

In FIG. 1, 5 is a sheet of facing material in wound state to be used for an upper side of the piled structure. Adhesive is applied on the under surface of said sheet 5 by roll 6. At 7, the plastic particles are supplied on sheet 5. A sheet 5' of facing material to be used for a lower side of the piled structure has adhesive applied on a surface thereof by roll 6' and 7' the particles are supplied thereto. The two sheets of facing materials with the particles therebetween are conveyed to the heating part. In FIGS. 1 and 7, 8 and 8' are a pair of endless belts in the heating part, 9 and 9' and 10 and 10' are guide rolls and drive rolls respectively, for the endless belts. Between rolls 9 and 9' and 10 and 10' endless belts 8 and 8' are respectively provided with opposed runs in spaced and parallel relation and said belts are supported under tension by numbers of small rolls 34 and 34'. Rolls 9, 9', 10 and 10' may all be heated by passing steam therethrough. In addition, roll 9 is fixed to frame 31, through bolt 35, spring 36, bearing 37, respectively, spring 36 maintaining belt 8 under tension by the elastic force thereof. Roll 9' is mounted and serves in the same way in respect of belt 8'. The paired endless belts 8 and 8' are positioned with active runs substantially parallel and moving in the same direction at equal speed. The spacing between the said paired endless belt runs is adjustable by inserting thin plate 33 between frames 31 and 31', and/or frames 32 and 32' whereto rolls 9, 9', 10 and 10' are fixed, respectively. In aforesaid example, endless belt 8 is made from metal, and endless belt 8' is made from butyl gum reinforced by polyethylene terephthalate fibers or glass fibers.

Belt 8 is in contact with carbon brush 11 which is grounded. Thus, belt 8 itself acts as one electrode of high frequency electric power. An opposite electrode 12 is established within the spacing enclosed by belt 8', adjacent to said belt 8', against the metallic belt 8. As for electrode 12, while it may be a single electrode it is preferred to form same of a plurality of electrically connected electrodes.

FIG. 2 shows schematically a portion of the heating part containing the type of electrode in which the electrode surface is fixed; and FIG. 3 shows schematically a portion of the heating part containing the type of electrode in which the contact surface is movable. Either type is suitable for present purposes.

In FIGS. 2, and 3, 12a is an electrode surface and 12b is a roll supporting the electrode surface. These are all supported by insulator 12d fixed to the frame of the apparatus. Remarkable differences between the two types of electrodes are as follows. In FIG. 2, the electrode surface 12a is fixed and connected directly to the supporting part 12c, and a rotating roll 12b is lacking. On the contrary, in FIG. 3, the electrode surface 12a itself is the endless belt, movably supported by two rotating rolls 12b. The electrode surface 12a in FIG. 2 is fixed whereon belt 8' slides whereas electrode surface 12a in FIG. 3 is able to rotate in accordance with the rotation of rolls 12b in the same direction and at equal speed along with endless belt 8'. Therefore, with the electrode shown in FIG. 3 damage due to friction is minimized.

A housing 13 covers the heating part and intercepts high frequency electric power generated from the electrodes and prevents the heat generated in the heating part from escaping.

In FIGS. 1, 5 and 8, respectively, 14 is a housing covering the drying part, wherein idling rolls 15, and blowing equipment 16, which blows heated air to the surface of the piled structure, are accommodated. In practical use of the invented apparatus, expandable particles are sometimes caused to expand further in said drying part.

The forming part is situated next to the drying part. In FIGS. 1 and 5, respectively, 20 is a housing covering the forming part wherein are accommodated numbers of paired rolls 17 and 18 which are arranged in parallel and such relation as they can hold a plane sheet between the openings or nips thereof. Among these rolls, all or a part of which are driven so as to further advance forwards a flat sheet conveyed from the heating part. The numbers of openings between paired rolls are all adjusted by regulating the poles 19 and 19'.

Figure 6:
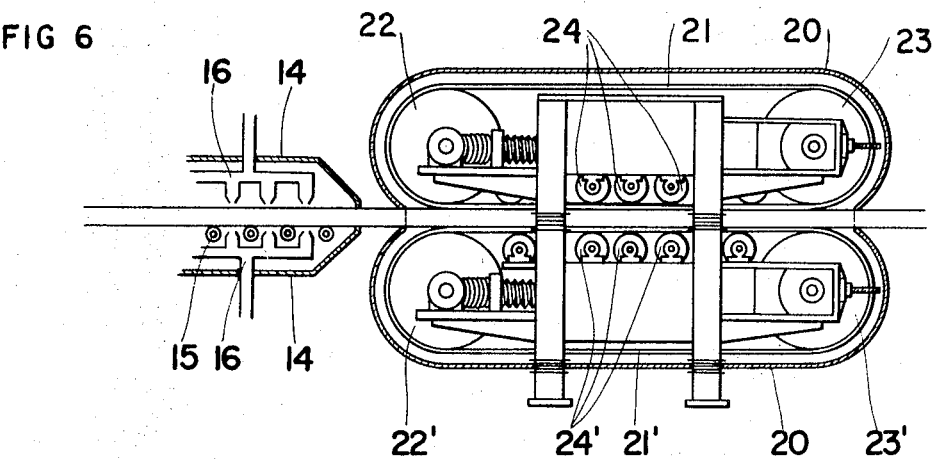
FIG. 6 shows schematically another example of a drying part and forming part of the invented apparatus.

FIG. 6 shows a portion of a drying part and a forming part of another example of the invented apparatus, and in said forming part a pair of metallic endless belts are made to press the piled structure. FIG. 8 shows an embodiment of forming part and of part of the drying part. In FIG. 6 and 8 respectively, 20 is a housing covering the forming part and a pair of metallic endless belts 21 and 21' are provided, which are caused to advance in parallel relation and at equal speeds by guide rolls 21 and 22' and by driving rolls 23 and 23', respectively. Numbers of paired small rolls 24 and 24' are arranged between rolls 22 and 23 and between rolls 22' and 23' respectively. Moreover, the space between the active runs of endless belts 21 and 21' is adjustable by changing the relative position of paired rolls 22 and/or 22' and of roll 23 and/or 23', respectively. It is convenient to adjust the space between paired rolls, for example, the space between rolls 22 and 21' by inserting a plate of adequate thickness between the frames supporting the rolls 22 and 22'.

Figure 9:
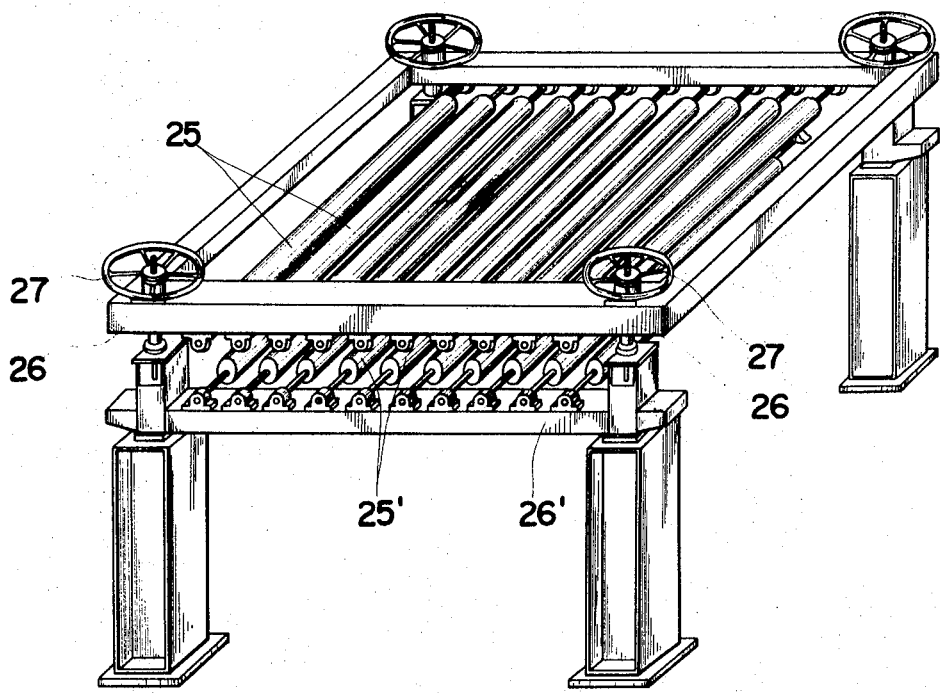
FIG. 9 is a similar view of an embodiment of a cooling part.

Next to said forming part there is arranged the cooling part which comprises numbers of pair rolls 25 and 25' (FIGS. 1 and 9). In FIGS. 1 and 9 respectively, 25 and 25' are all paired rolls. These rolls are arranged in parallel and such as to hold a plane sheet. The spaces between rolls 25 and 25' may be adjusted by rotating the handle 27 screwed in the frame 26 supporting the roll 25. In the cooling part, however, rolls 25 and 25' do not press so heavily against the sheet openings of paired rolls as those in the forming part. Moreover, in the cooling part, cooled air is blown in order to cool the sheet.

This apparatus has the advantages of reducing the loss of high frequency electric power, and can be used in case of low voltage of high frequency electric power; consequently, the panels produced are of good quality and the process is carried out with high efficiency. The panel prepared by the present invention has good mechanical strength and is light in weight because it is constructed of two sheets of facing materials and of thermoplastic resin foamed plate interposed therein. Particularly, the foamed plate is made by tightly cohering foamed particles to one another on their entire surfaces, and such plate is affixed tightly to the facing materials. Therefore, the panel may be used in various fields such as packaging materials, e.g. in making boxes, fixtures, shock-absorbing materials, thermal insulators and panels for home construction and the like.

Regarding the case wherein panels are produced having two sheets of kraft papers as facing materials and polystyrene foamed plate as a core, operations by this invented apparatus are as follows.

EXAMPLE

Polystyrene particles about 0.5 to 1.5 mm. in diameter containing propane about 6% in weight therein are placed on wire nettings, and are prefoamed by subjecting same to contact with steam at 100° C. for about 2 minutes. Thereby, prefoamed polystyrene particles are obtained with an expansion volume of about 75 times the original volume.

A water solution may be used wherein 1 part NON-ION–NS–210 (commercial name of non-ionic type surface active agent manufactured by Nihon Yushi K.K.) and 2 parts sodium chloride are dissolved in 100 parts water. This solution may be fed from tank 3 (FIG. 1).

The prefoamed particles are integrated by the water solution in the ratio of 100 parts to 50 parts, and the integrated particles are supplied from the unit 4.

At 5 and 5', respectively, rolls of kraft papers 180 g./m.$^2$ in thickness used for corrugated board are positioned. Water emulsion of polyvinyl acetate is contained in the tanks in contact with rolls 6 and 6', so as to apply polyvinyl acetate on one whole surface of the kraft papers. Rotation speeds of rolls 6 and 6' respectively are regulated so as to apply polyvinyl acetate emulsion at 88 g. per m.$^2$ to surfaces of kraft paper.

Two sheets of kraft paper are thus obtained opposite each other, with facing surfaces coated with emulsion and in parallel and close relation. Between the paper sheets the prefoamed particles are positioned. Piled structure thus obtained was 9 mm. in thickness. In the heating part, the upper endless belt 8 was made from stainless steel, and the lower endless belt of butyl gum reinforced by polyethylene terephthalate fibers. The space between the two endless belts was adjusted to 14 mm., and therethrough the piled structure passed. High frequency electric power of 13.56 mH.$^2$ and 3000 volts was applied between the endless belt 8 and opposite electrode 12 established closely to endless belt 8'. The piled structure was conveyed from the heating part, and dried by air at 105° C. ejected from pipe 16, while being supported only from below by rotating rolls 15.

Thereafter, the piled structure was conveyed to the forming part of the type shown in FIGS. 6 and 8. In the forming part, the opening between the pair of endless belts 21 and 21' was adjusted to 6 mm., and the endless belts were heated to about 100° C. In this part, the piled structure was compressed into laminated plate, wherein foamed polystyrene particles were combined one with another into a continuous interlayer having an expansion volume about 50 times its prior volume the interlayer was affixed firmly to the kraft papers at both sides thereof. The laminated plate thus obtained contained only little water and had no tendency to warp and was of good quality.

What is claimed is:

1. Apparatus for continuous preparation of sandwich-type panels from two sheets of facing materials and expandable thermoplastic resin particles, comprising material supplying means, heating means and forming means, said material supplying means continuously supplying at least two sheets of facing materials in spaced and parallel relation and expandable thermoplastic resin particles in the spacing between said facing material, said heating means including a pair of endless belts and a high frequency electrical power applying unit, one of the belts of said pair being metallic and the other non-metallic and of electrically insulated low loss factor material against high frequency electric power, said belts each having a run spaced from and parallel to one another to hold a flat sheet therebetween and moving in same direction and at same speed, said metallic belt itself being grounded and used for an electrode of high frequency electric power, and opposing electrode being established within the spacing enclosed by the belt of electrically insulated low loss factor material, said forming means comprising a number of pairs of rolls arranged in cooperating pairs in spaced and parallel relation and a pair of endless belts respectively positioned adjacent said paired rolls in parallel and spaced relation so as to maintain a flat sheet in the space therebetween, the space between the belts of the forming means being adjustable independently of the heating means spacing, said paired rolls being driven so as to further advance the sheet from said heating means.

2. Apparatus according to claim 1, wherein drying means are positioned between said heating means and said forming means, said drying means including rotating rolls and pipes, said rotating rolls supporting the piled structure merely from below, said pipes being positioned respectively on the upper side of and lower side of said rotating rolls and ejecting hot air against the piled structure.

References Cited

UNITED STATES PATENTS

| | | | |
|---|---|---|---|
| 2,545,370 | 3/1951 | Mittelmann | 156—273X |
| 2,766,362 | 10/1956 | Kinder et al. | 156—273UX |
| 2,998,501 | 8/1961 | Edberg et al. | 156—380X |
| 3,180,776 | 4/1965 | Hessel | 156—499UX |
| 3,223,027 | 12/1965 | Soda et al. | 156—583X |

BENJAMIN A. BORCHELT, Primary Examiner

J. J. DEVITT, Assistant Examiner

U.S. Cl. X.R.

156—499